United States Patent [19]
Schmalzriedt

[11] 3,833,846
[45] Sept. 3, 1974

[54] DIGITAL VELOCITY SENSOR FOR MOTOR BRAKING

[75] Inventor: Truman T. Schmalzriedt, Westland, Mich.

[73] Assignee: Burroughs Corporation, Detroit, Mich.

[22] Filed: Aug. 30, 1973

[21] Appl. No.: 393,015

[52] U.S. Cl. ............................. 318/369, 318/374
[51] Int. Cl. .............................................. H02p 3/06
[58] Field of Search ........... 318/364, 369, 373, 374, 318/383, 463, 464, 603

[56] References Cited
UNITED STATES PATENTS

| | | | |
|---|---|---|---|
| 3,628,119 | 12/1971 | Abraham | 318/603 X |
| 3,737,751 | 6/1973 | Lima | 318/373 X |
| 3,761,790 | 9/1973 | Daab | 318/369 X |

Primary Examiner—Robert K. Schaefer
Assistant Examiner—W. E. Ducanson, Jr.
Attorney, Agent, or Firm—Charles P. Padgett, Jr.; Edwin W. Uren; Edward G. Fiorito

[57] ABSTRACT

A method and apparatus for digitally controlling the braking energy to a motor so as to eliminate undershoot or over-shoot. A digital differentiator is used to generate a narrow-width pulse for every rise and fall of a motor tachometer pulse output. The period of these pulses is proportional to the motor velocity and the pulses are used to continuously reset a digital counter. When braking is required, a control flip-flop is "set" causing braking energy to be sent to the motor by way of a low dissipation digital driver. The duration of application of this braking energy is controlled by the digital counter which is clocked at a rate such that at normal operating speeds for the motor, the counter is reset to begin a new count long before a predetermined count is reached. Once the control flip-flop has been "set" and the braking energy is being supplied to the motor, the reset pulses from the digital differentiator will be generated less frequently, the counter will be reset less often, and the clock count between successive resets will become greater. Eventually, when the speed of the motor has been substantially reduced and is approaching zero, the counter will be able to reach the predetermined count before being reset and a signal representative of the attainment of this predetermined count is used to "reset" the control flip-flop thereby turning off the supply of braking energy to the motor.

13 Claims, 7 Drawing Figures 3,833,846

DIGITAL VELOCITY SENSOR FOR MOTOR BRAKING

BACKGROUND OF THE INVENTION

This invention relates generally to a method and apparatus for digitally controlling the braking of a motor.

Most conventional methods of braking a servo motor rely, at least to some extent, on analog devices. A DC braking signal of an amplitude proportional to the motor speed is usually derived by integating the system tachometer pulse output or directly in the case of a DC tachometer. This signal is applied to suitable control circuitry and thence to a servo amplifier which is used to supply braking energy to the motor. These systems are usually designed so that the braking energy decays to zero as the motor speed approaches zero velocity. This method is quite costly because of the large power dissipation inherent in linear servo amplifiers, and the reliability of such systems is questionable since they are subject to drift about the DC operating point with variations in time and temperature.

A second conventional approach uses a fixed-duration and fixed-amplitude braking pulse of reverse energy. Such systems do not take into account the varying mechanical parameters of the system and are not usually self-compensating thereby resulting in frequent occurrences of under-shoot or over-shoot. The design of a system which avoids these problems previously involved the use of complex expensive equipment which was difficult to maintain and repair.

BRIEF SUMMARY OF THE INVENTION

It is an object of this invention to provide a method and apparatus for digitally controlling the braking of a motor.

It is a further object of this invention to provide a method and apparatus for accomplishing a rapid velocity-controlled stop without over-shoot or under-shoot.

It is still a further object of this invention to provide a method and apparatus for digitally controlling the braking of a servo motor by terminating the braking energy at a predetermined digitally-ascertainable point at which the volocity has been substantially reduced.

It is yet a further object of this invention to provide a simple and economical digital circuit for controlling the period of application of braking energy to a servo motor.

These and other objects of this invention are accomplished by a digital braking control system wherein a control flip-flop is initially "set" so as to enable a digital driver to supply braking energy to a servo motor. A digital tachometer associated with the motor is used to generate pulses whose period is proportional to the motor speed. A digital differentiator receives the pulses from the tachometer and generates a series of narrow reset pulses at each transition of the tachometer pulses. The reset pulses are used to "reset" a binary ripple counter such that the final stage of the counter will never go "high" during normal operation of the motor. As the motor slows, the reset pulses are generated less frequently, until, at some time at which the motor speed has been substantially reduced and is approaching zero, the counter is not reset and the final stage is allowed to go "high." This condition is used to reset the control flip-flop and shut off the flow of braking energy to the servo motor thereby completing a rapid velocity-controlled stop without under-shoot or over-shoot.

Other objects, features and advantages of this invention will be readily apparent and better understood by reference to the following detailed description when considered in conjunction with the appended claims and the accompanying drawings in which:

Figure 1:
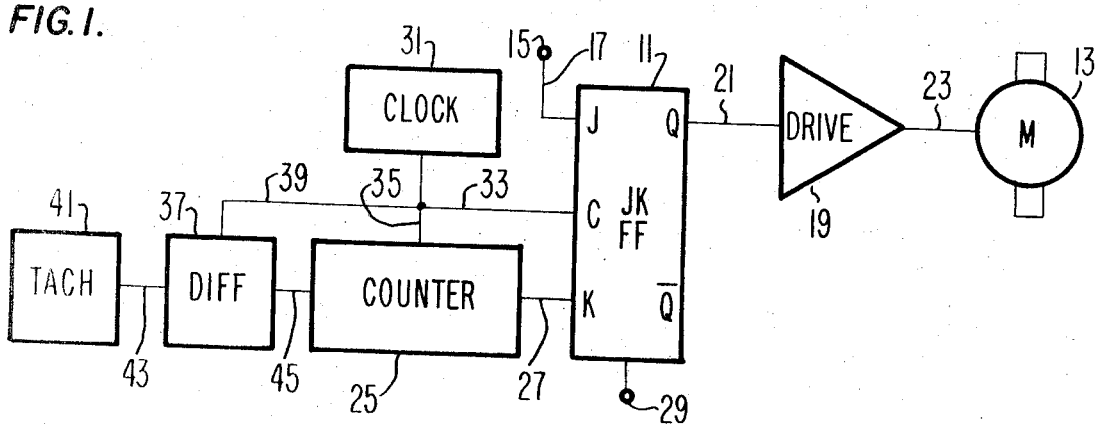
FIG. 1 is a block diagram showing the digitally controlled motor braking system of the present invention.
Figure 2:
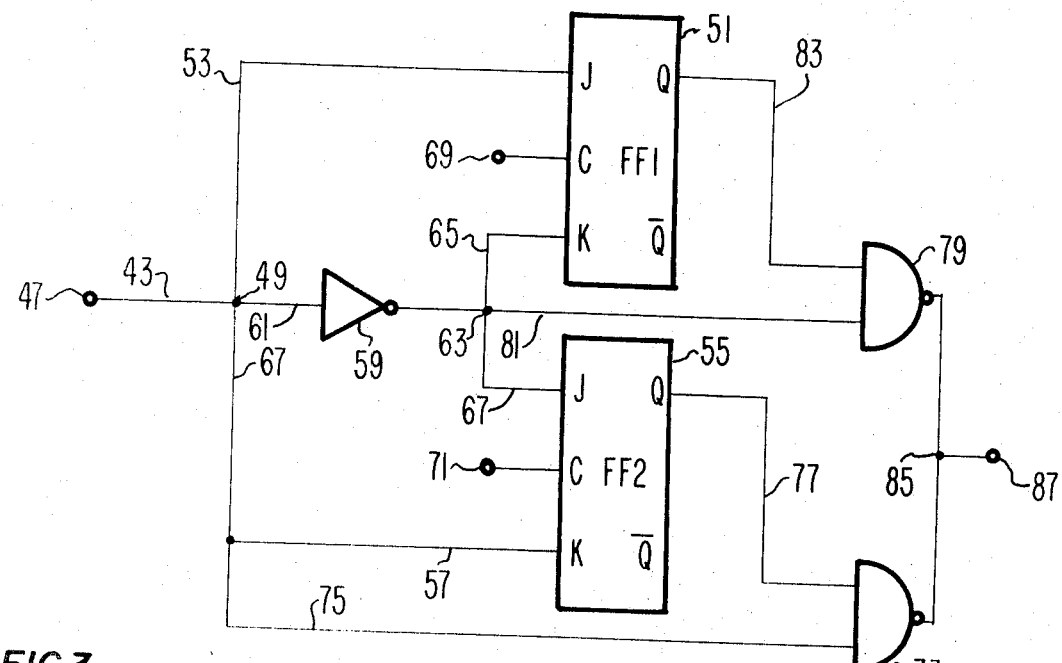
FIG. 2 is a schematic diagram of the digital differentiator of the system of FIG. 1.
Figure 5:
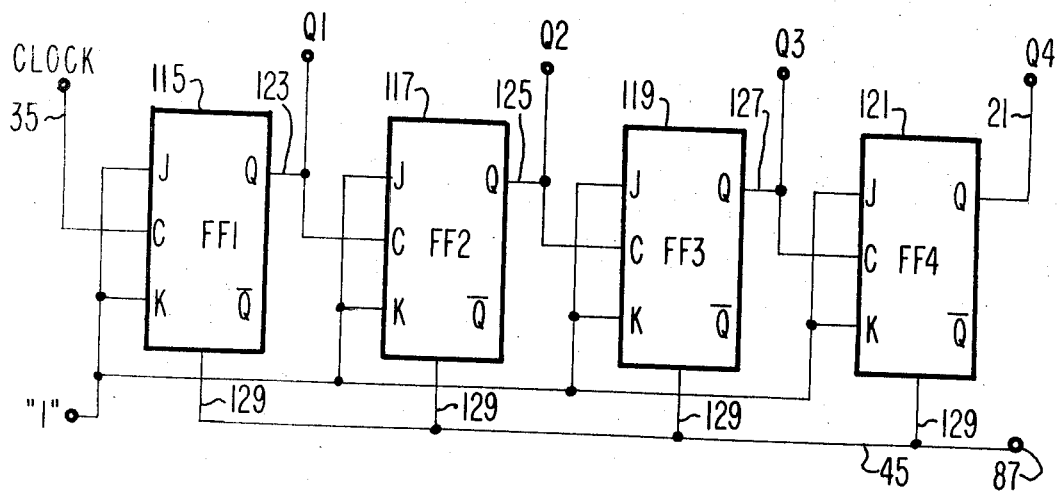
FIG. 5 is a schematic diagram depecting the binary ripple counter of the system of FIG. 1.
Figure 6:
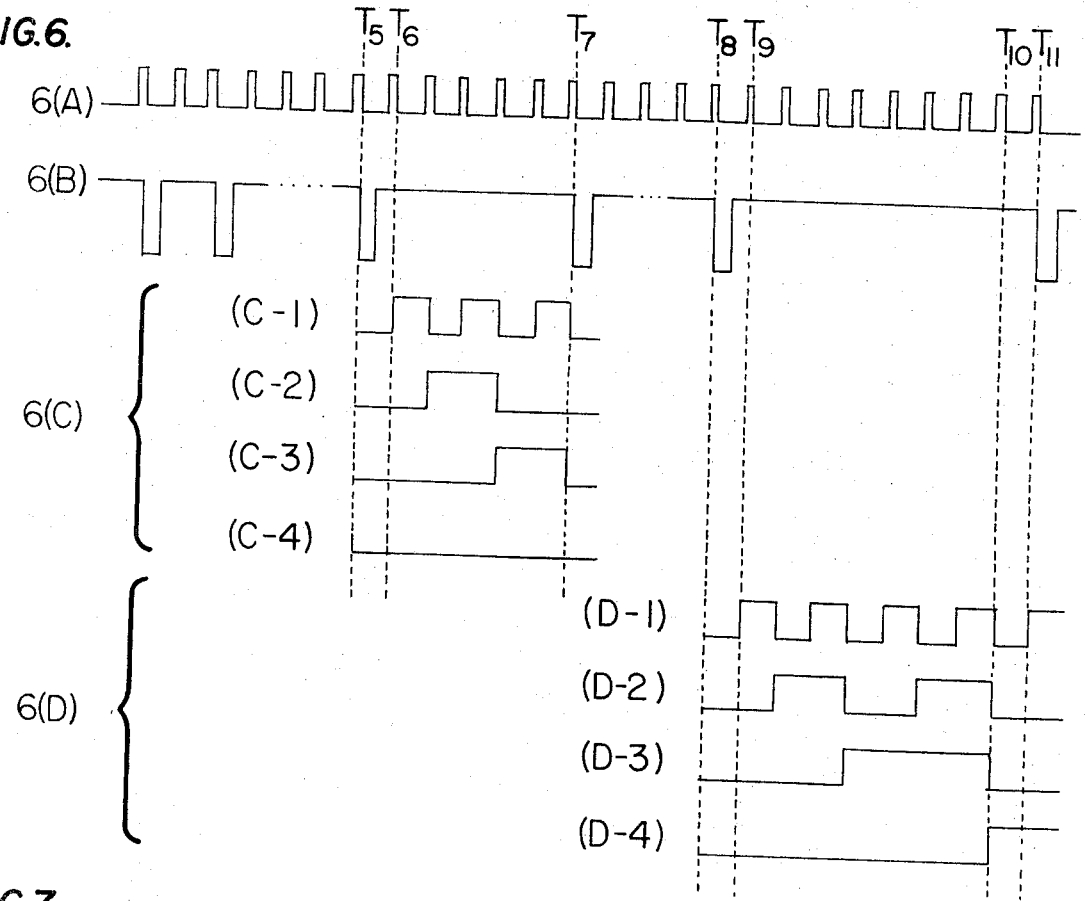
Figure 7:
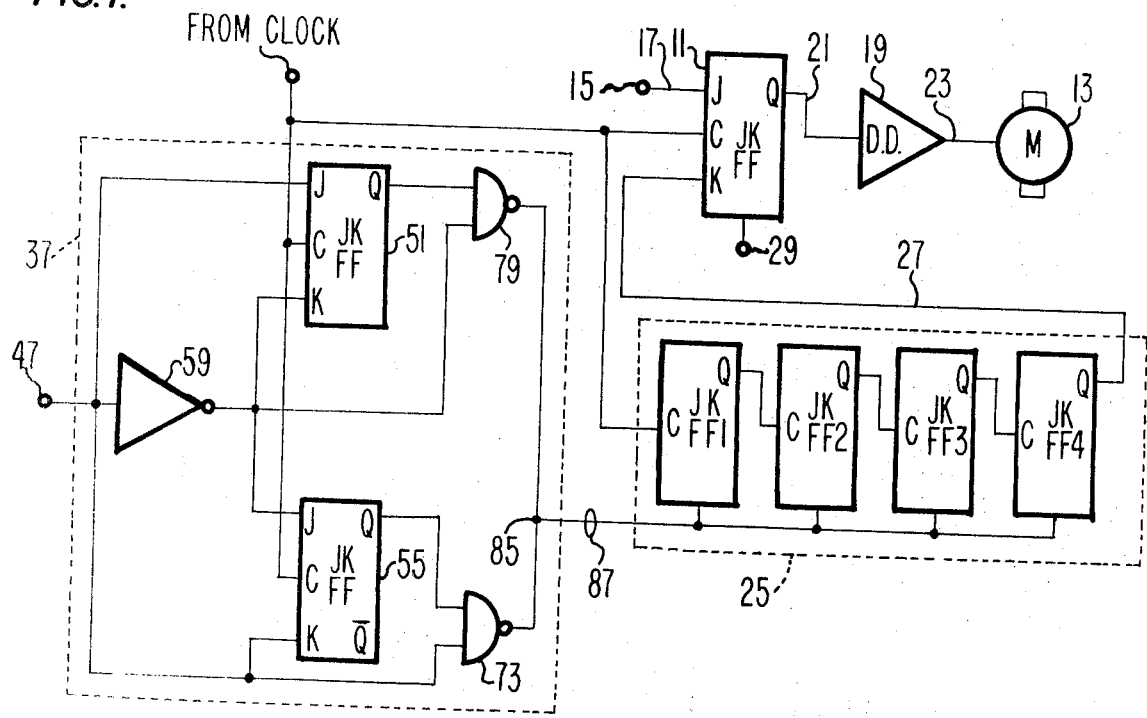

FIG. 6(A–D) are timing diagrams which illustrate the relationship between the reset pulses generated by the digital differentiator of the circuit of FIG. 2 and the corresponding states of the various stages of the binary ripple counter of FIG. 5; and FIG. 7 is a schematic diagram of the digitally controlled motor braking system of FIG. 1 and illustrating the contents of some of the blocks in greater detail.

DETAILED DESCRIPTION OF THE DRAWINGS

The basic digitally-controlled motor braking system of the present invention will be described with reference to FIG. 1 which illustrates the overall system in block diagram form. A JK control flip-flop 11 is used to control the supply of braking energy to a servo motor 13. An "enable-stop" signal is applied to the "J" input of control flip-flop 11 via "enable-stop" input 15 and lead 17. The presence of the "enable-stop" signal at the "J" input of the control flip-flop 11 operates to "set" the control flip-flop 11 and place the "Q" output in a "high" stage. This "high" signal is supplied to a low dissipation digital driver 19 via lead 21 and is used to control the digital driver so as to enable it to supply braking energy to the servo motor 13 via lead 23.

A "reset" signal from binary ripple counter 25 is supplied via lead 27 to the "K" input of control flip-flop 11. The application of this "reset" pulse to the "K" input will operate to "reset" the control flip-flop 11, cause the "Q" output to go "low," and disable the digital driver 19 thereby shutting off the flow of braking energy to the servo motor 13. A "clear" input 29 is provided on the control flip-flop so as to enable the "Q" output to be placed initially in a "low" state when power is first applied to the circuit.

A source of clock pulses 31 is used to supply a train of fixed-rate clock pulses to the clock input of control flip-flop 11 via lead 33, to the binary ripple counter 25 via lead 35, and to a digital differentiator 37 via lead 39. A source of tachometer pulses 41 is used to generate a series of digital tachometer pulses whose period is proportional to the velocity of the servo motor 13. The source of tachometer pulses 41 may be from a digital tachometer or from an analog tachometer with associated pulse-shaping circuitry. In any case, the tachometer pulses are fed via lead 43 to the digital differentiator 37 which generates a train of negative-going narrow-width pulses for each transition of the digital tachometer pulses and these negative-going narrow-width reset pulses are similarly proportional to the speed of the servo motor 13. These negative-going narrow-width reset pulses are fed via lead 45 to the binary ripple counter 25 and are used to periodically reset or clear the various stages of the binary counter. By predetermined adjustment of the rate of the tachometer pulses for normal motor speed and by a specific selection of a clock rate, the rate of the binary ripple counter 25 can be selected so that it is always reset or cleared before the last stage of the counter goes "high," until, at some predetermined substantially reduced motor speed, nearly zero, the reset pulses from the digital differentiator, which are representative of the reduced motor speed, are arriving at a rate which is insufficient to reset the counter before the final stage goes "high." At this point, a control "reset" signal is generated by the counter and is supplied via lead 27 to the "K" input of the control flip-flop 11 so as to "reset" the control flip-flop, disable the digital driver 19, and turn off the supply of braking energy to the motor 13 as discussed hereinabove.

The circuit of FIG. 2 illustrates one embodiment of the digital differentiator of the circuit of FIG. 1. A digital differentiator input 47 is used to supply the digital tachometer pulses from tachometer 41 to junction 49 via lead 43. The tachometer pulses are then supplied to the "J" input of JK flip-flop 51 via lead 53 and to the "K" input of a JK flip-flop 55 via lead 57. The tachometer pulses present at junction 49 are also fed to an inverter 59 via lead 61 and the output of the inverter is supplied to a junction 63 and thence to the "K" input of JK flip-flop 51 via lead 65 and to the "J" input of JK flip-flop 55 via lead 67.

A train of clock pulses from clock source 31 of the circuit of FIG. 1 are supplied to a clock input 69 of JK flip-flop 51 and to a clock input 71 of JK flip-flop 55. The original tachometer signal from junction 49 is supplied to one input of a NAND gate 73 via lead 75. The other input of NAND gate 73 is taken from the "Q" output of JK flip-flop 55 via lead 77. Similarly, the inverted tachometer pulses are fed from junction 63 to one input of a NAND gate 79 via lead 81 while the other input of NAND gate 79 is connected via lead 83 to the "Q" output of JK flip-flop 51. The output of NAND gate 73 is joined to the output of NAND gate 79 at a junction 85 and the digital differentiator output 87 is taken from this "ORed" junction, and is used to supply a train of negative-going narrow-width reset pulses which are proportional in period to the speed of the servo motor 13 to the binary ripple counter 25 of FIG. 1 via lead 45.

Figure 3:
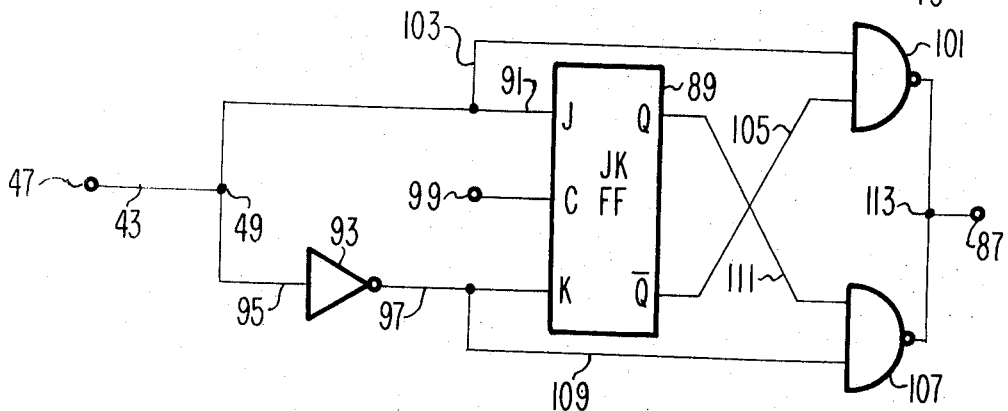
FIG. 3 is a schematic diagram showing an alternate embodiment of the ditial differentiator of FIG. 2.

The schematic diagram of FIG. 3 illustrates an alternate embodiment to the digital differentiator circuit of FIG. 2. In the circuit of FIG. 3, the digital tachometer pulses are supplied to digital differentiator input 47 and via lead 43 to junction 49 and thence to the "J" input of a JK flip-flop 89 via lead 91. The tachometer pulses are also supplied from the junction 49 to an inverter 93 via lead 95 and the output of the inverter 93 is connected via lead 97 to the "K" input of JK flip-flop 89. Clock pulses are supplied to the clock input 99 of JK flip-flop 89 via lead 39 of the circuit of FIG. 1.

A NAND gate 101 has one input supplied with the original tachometer pulses from the junction 49 via lead 103 and the other input connected to the "Q" output of JK flip-flop 89 via lead 105. Similarly, a second NAND gate 107 has one input connected to the inverted tachometer pulses present at the output of inverter 93 via lead 109 and the other input connected to the "Q" output of JK flip-flop 89 via lead 111. The output of NAND gate 101 is connected to the output of NAND gate 107 at the junction 113 and this "ORed" junction is connected to the binary ripple counter 25 via digital differentiator output 87 and lead 45 of the circuit of FIG. 1.

Figure 4:
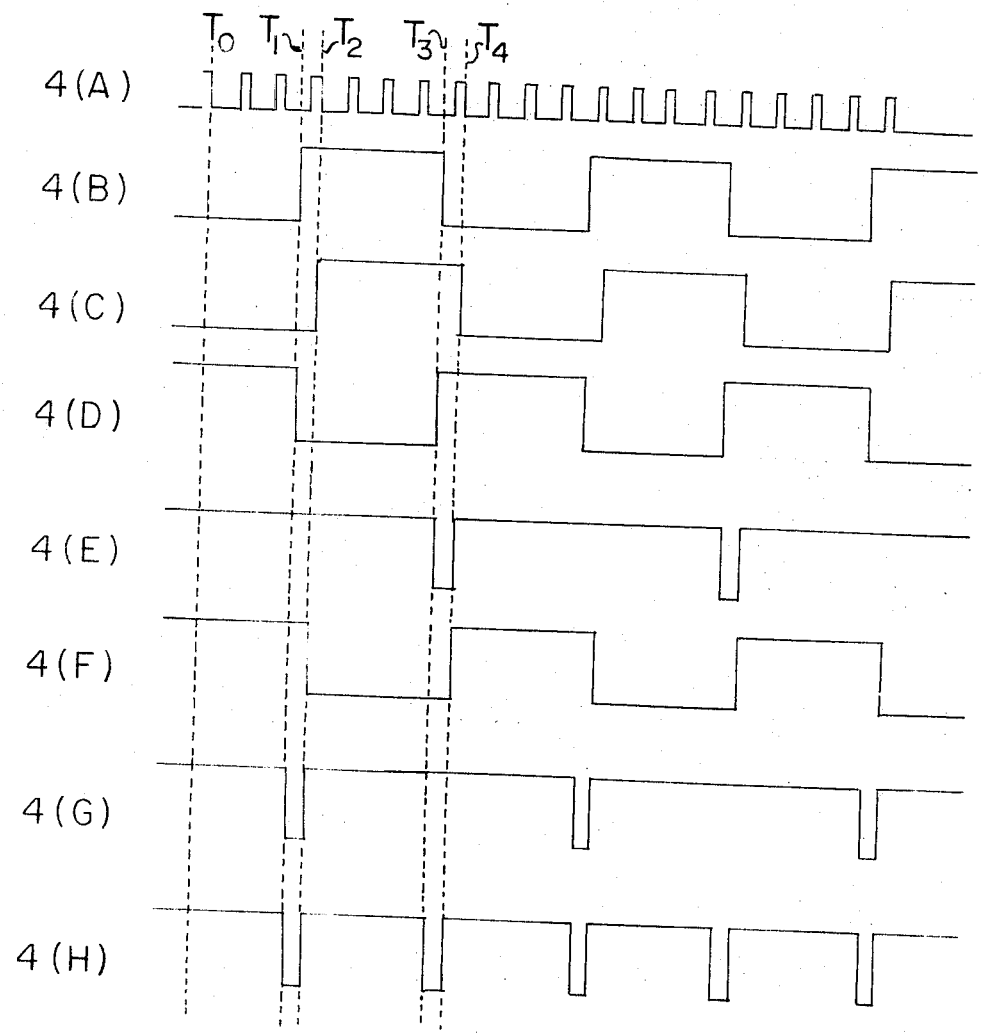
FIG. 4(A–H) are timing diagrams showing the relationship between signals present at various points in the digital differentiator of FIGS. 2 and 3.

The operation of the digital differentiator of the circuit of FIG. 2 will now be described with reference to the timing diagram of FIG. 4. FIG. 4(A) is meant to illustrate a train of clock pulses from the clock 31 of the circuit of FIG. 1. This train of clock pulses is fed to the clock inputs 69 and 71 of JK flip-flops 51 and 55 respectively. The digital pulse train illustrated in FIG. 4(B) represents the output of a digital tachometer or any train of suitably shaped tachometer pulses which is supplied to the input 47 from the source of tachometer pulses 41 and thence via lead 43 to the junction 49. Since junction 49 is connected to the "J" input of JK flip-flop 51 via lead 53, and since the presence of a binary "one" at the "J" input of a JK flip-flop will "set" the flip-flop and cause the "Q" output to go "high" after the fall of the clock input 69, the timing diagram of FIG. 4(C) illustrates that the "Q" output of JK flip-flop 51 goes "high" in response to the arrival of a "high" pulse at the "J" input but that the "Q" output does not change state until the trailing edge of the first clock pulse to occur after the arrival of a "high" pulse at the "J" input.

The inverted tachometer pulses from the junction 63 are shown in the timing diagram of FIG. 4(D) and are readily seen to be the inverse of the signal depicted on the timing digram 4(B). As is known in the art, the output of a NAND gate will go low for only that period of time during which all of the inputs are high. Since the inputs of NAND gate 79 are taken from the "Q" output of JK flip-flop 51 and from the output of inverter 59 they may be represented by the timing diagrams of FIG. 4(C) and 4(D) respectively. Looking at these two timing diagrams, it is seen that they are simultaneously high for only a short interval of time as represented by that interval between the time $T_3$ when the "Q" output of JK flip-flop 51 is still in a "high" state and a "high" pulse has been received at the "K" or reset input of JK flip-flop 51 and the time $T_4$ which represents the time of occurrence of the trailing edge of the first clock pulse to arrive at clock input 69 of JK flip-flop 51 after the arrival of a "high" at the "K" or "reset" input of JK flip-flop 51. Upon the occurrence of the trailing edge of the first clock pulse to arrive after a "reset" has been triggered, at time $T_4$, the "Q" output will go low and the output of NAND gate 79 will again go high. Reference to FIG. 4(E) shows the output of NAND gate 79 and it is seen that a series of negative-going narrow-width pulses are generated at the trailing edge of each of the original tachometer pulses.

The output of NAND gate 73 is similarly illustrated. FIG. 4(F) shows the train of pulses from the "Q" output of JK flip-flop 55. It is readily seen, that since the inputs of JK flip-flop 51 are the inverse of the inputs to JK flip-flop 55, the "Q" output of JK flip-flop 55 is the inverse of the "Q" output of JK flip-flop 51. This represents one input of NAND gate 73 and the other input is represented by the train of original tachometer pulses from the junction 49 as previously illustrated in timing diagram 4(B). A comparison of the timing diagrams of FIGS. 4(B) and 4(F) illustrates that both inputs are simultaneously high for only that short period of time between time $T_1$ when a high has been presented to the "K" input of JK flip-flop 55 and a time $T_2$ at which the trailing edge of the first clock pulse to arrive thereafter has triggered the change of state at the "Q" output. The output of NAND gate 73 is illustrated at timing diagram 4(G) and it is seen that a series of negative-going, narrow-width pulses are produced at the leading edge of each of the original tachometer pulses.

The timing diagram of FIG. 4(H) shows signals present at the junction 85 and the output of the digital differentiator 87 and it is seen to be the combined outputs of NAND gate 73 and NAND gate 79. This series of pulses is proportional to the speed of the servo motor 13 and is supplied via lead 45 to "reset" the binary counter 25 of the circuit of FIG. 1.

The operation of the circuit of FIG. 3 is similar to that described above with NAND gate 101 corresponding to NAND gate 73 of the circuit of FIG. 2 and the output of NAND gate 101 being represented by the timing diagram of FIG. 4(G) and NAND gate 107 corresponding to NAND gate 79 of the circuit of FIG. 2 with the output of NAND gate 107 being illustrated by the timing diagram of FIG. 4(E). The summed outputs from junction 113 taken from the output 87 of the digital differentiator is identical to the output of the digital differentiator of the circuit of FIG. 2 and both are represented by the timing diagram of FIG. 4(H).

FIG. 5 illustrates in more detail the binary ripple counter 25 of the circuit of FIG. 1. Four stages are illustrated comprising JK flip-flops 115, 117, 119 and 121 respectively. All of the "J" inputs are coupled directly to the "K" inputs and thence to a signal representing a binary "one" state. The "Q" output of JK flip-flop 115 is connected to the clock input of the next succeeding stage, JK flip-flop 117, via lead 123. An output from the first stage for JK flip-flop 115 has been illustrated as $Q_1$ for explanatory purposes only. The "Q" output of JK flip-flop 117 is supplied to the next successive stage, JK flip-flop 119, via lead 125 and an illustrative output $Q_2$ is shown for the output of the second stage. The "Q" output of the third stage of the counter, JK flip-flop 119, is supplied to the clock input of the fourth and final stage of the counter, JK flip-flop 121, via lead 127 and the illustrative output of the third stage is labeled $Q_3$.

The "Q" output of the final stage of the binary ripple counter, JK flip-flop 121, is illustrated by the output labeled $Q_4$ and is supplied via lead 21 to the "K" input of control flip-flop 11 of the circuit of FIG. 1. A counter clear or reset input 87 corresponds to the similarly numbered output of the digital differentiator circuits of FIGS. 2 and 3 and is used to supply a series of negative-going, narrow-width reset pulses, as illustrated by the timing diagram of FIG. 4(H), to the "clear" input of each of the stages of the binary ripple counter via lead 45 and the individual "clear" leads 129.

The operation of the binary ripple counter of FIG. 5 is under the control of the clock 31 and a series of clock pulses are supplied to the clock input of the first stage of the counter, JK flip-flop 115, via lead 35. The operation of a binary ripple counter is well known in the art and will not be discussed in detail, but it will be readily apparent that the $Q_1$ output of the first stage of the counter, JK flip-flop 115, will change state with each clock input while the $Q_2$ output will change state with every other clock pulse, $Q_3$ with every fourth pulse, and $Q_4$ with every eighth clock pulse. Since the $Q_4$ output of JK flip-flop 121 is used to reset the control flip-flop 11, it is readily apparent that the reset signal will never be generated unless the counter is able to count to eight before being reset.

The operation of the overall system of the present invention will be described with reference to FIGS. 6 and 7. FIG. 7 shows most of the elements of the block diagram of FIG. 1 in greater detail. Initially, the servo motor 13 is being operated at some normal operating speed and it is desired to bring the motor to a rapidly controlled stop. An "enable-stop" signal is generated and supplied to input 15 and via lead 17 to the "J" input of control flip-flop 11. Since the control flip-flop 11 was initially cleared by the application of a clear pulse to clear input 29, the arrival of an enable pulse at the "J" input will "set" the control flip-flop 11 and cause the "Q" output to go "high." This signal is transmitted via lead 21 to digital driver 19 and causes the digital driver to supply braking energy to the servo motor 13 via lead 23.

As the braking energy is supplied to the servo motor and the motor begins to slow, the stream of digital tachometer pulses supplied to the input 47 of digital differentiator 37 will begin to have increasingly greater periods. As discussed hereinabove, the digital differentiator 37 will supply a negative-going, narrow-width reset pulse at the output 87 of the digital differentiator circuit for each transition of the tachometer input pulse. At some time shortly after braking has been initiated, for example, at $T_5$ on the timing diagram of FIG. 6, the time interval between successive reset pulses, as illustrated by the timing diagram of FIG. 6(B), is increasing. At time $T_5$, for example, a reset pulse has been generated and used to restart the binary ripple counter 25. With each successive clock pulse, the counter will increment by a count of one until the arrival of the next reset pulse. The timing lines of FIG. 6(C) and in particular, lines C-1 through C-4, illustrate the count of stages 1–4 of the binary counter respectively between successive reset pulses. It is seen that the counter reset pulse which is generated at time $T_7$ has reset the binary counter 25 before the generation of an eight count, as illustrated by timing line 6(C-4) having remained low.

At some later time, as the motor has slowed to a speed approaching zero, a reset pulse has been generated at time $T_8$. The binary ripple counter 25 begins to count anew with the next clock pulse at time $T_9$ and continues to count until the arrival of the next reset pulse at time $T_{11}$ but, as seen in the timing diagrams of FIG. 6, this interval is sufficient for the counter to count more than eight clock pulses, and as illustrated by the timing diagram of FIG. 6(D), the final stage of the binary counter, FF4, is permitted to go "high" as illustrated by timing line 6(D-4). This "high" signal from the "Q" output of the final stage of the binary counter 25 is transmitted via lead 27 to the "K" input of control flip-flop 11 and operates to "reset" the flip-flop. The "Q" output of control flip-flop 11 is caused to go "low," disabling the digital driver 19, and shutting off the flow of braking energy to the servo motor 13 at some predetermined speed just short of a full stop. The motor is then allowed to coast to a stop without any possibility of over-shoot and no substantial undershoot.

With this detailed description of the operation of the present invention it will be obvious to those skilled in the art that various modifications can be made without departing from the spirit of the scope of the invention which is limited only by the appended claims.

What is claimed is:

1. A motor braking control system wherein a motor operating at a normal motor speed is braked in response to the application of a braking current comprising:

tachometer means associated with said motor for generating tachometer signals proportional to the speed of said motor;

counter means for counting at a fixed predetermined clock rate;

means responsive to said tachometer signals for resetting said counter means at a rate sufficient to prevent the attainment of a predetermined count until the speed of said motor has been reduced to a predetermined fraction of said normal motor speed; and means responsive to the attainment of said predetermined count for removing said braking current.

2. The motor braking control system of claim 1 wherein said means for removing said braking current includes a bistable element operable in a first state to enable the application of braking current to said motor and triggerable to a second state in response to the attainment of said predetermined count for disenabling the application of braking current to said motor.

3. The motor braking control system of claim 2 wherein said bistable means includes a JK flip-flop and a digital driving means, wherein the output of said JK flip-flop is coupled to said digital driving means, and wherein said digital driving means is responsive to a first state of said JK flip-flop for applying braking current to said motor and to a second state of said JK flip-flop for removing braking current from said motor and wherein said JK flip-flop is responsive to the attainment of said predetermined count for changing from said first state to said second state.

4. The motor braking control system of claim 1 wherein said counter means includes a clocked binary ripple counter.

5. The motor braking control system of claim 4 wherein said binary ripple counter includes four JK flip-flop stages and wherein the transition of the final flip-flop stage which occurs on the eighth clock pulse is used to provide said signal representative of the predetermined count.

6. The motor braking control system of claim 5 wherein said resetting means includes digital differentiator means and wherein the output of said digital differentiator means is fed to the "clear" input of each of the stages of said binary ripple counter for resetting said counter at a rate proportional to the speed of the motor.

7. The motor braking control system of claim 6 wherein said digital differentiator means includes:

means responsive to said tachometer signals for generating a series of negative-going, narrow-width, reset pulses at each positive and negative transition of the tachometer signals.

8. The motor braking control system of claim 6 wherein said digital differentiator means includes:

means for receiving said tachometer signals from said tachometer signal generator;

means for inverting said tachometer signals;

a first flip-flop having a first input supplied with said tachometer signals and a second input supplied with inverted tachometer signals and a second flip-flop having its first input supplied with inverted tachometer signals and its second input supplied with said non-inverted tachometer signals;

a NAND gate having one input coupled to the high output of said first flip-flop and a second output coupled to said source of inverted tachometer pulses, and a second NAND gate having one input coupled to the high output of said second flip-flop and a second input coupled to said source of non-inverted tachometer pulses; and means for combining the output of said first and second NAND gates for producing said train of negative-going, narrow-width reset pulses.

9. The motor braking control system of claim 7 wherein said digital differentiator includes:

a JK flip-flop;

means for supplying a source of tachometer pulses to the "J" input of said flip-flop;

means for supplying inverted tachometer pulses to the "K" input of said flip-flop;

a first NAND gate means coupled to the "Q" output of said flip-flop and to said source of tachometer signals for generating a negative-going, narrow-width pulse at the leading edge of each of said tachometer pulses;

a second NAND gate means coupled to the "Q" output of said flip-flop and to said source of inverted tachometer pulses for generating a second set of negative-going, narrow-width pulses at the trailing edge of each of said tachometer pulses; and means for combining said first and said second set of signals so as to generate a series of negative-going, narrow-width, reset pulses occurring at both the positive and the negative transitions of said tachometer pulses.

10. A digital duration controller for determining the duration of application of a braking signal to a servo motor, said controller comprising:

means for generating digital tachometer pulses at a rate proportional to the speed of said servo motor;

a resettable binary counter operable at a fixed clock rate;

digital differentiator means responsive to said tachometer pulses for generating reset pulses at a rate proportional to the speed of said servo motor; and means responsive to a condition existing when the rate of generation of said reset pulses has been reduced to some value indicative of a predetermiend reduction in motor speed and coupled to said counter means for terminating the application of a braking signal to said servo motor.

11. In a motor braking system wherein the speed of the motor is reduced by the application of braking energy, a digital circuit for controlling the duration of application of the braking current so as to prevent overshoot, said digital circuit comprising:

means for establishing a predetermined interval of time;

means for generating a series of pulses indicative of the speed of the motor; and means responsive to said speed indicative pulses for permitting the continued application of said braking current until the speed of said motor has been substantially reduced and for removing said braking current from said motor whenever one of said speed indicative pulses does not occur in said predetermined interval of time.

12. A method for digitally determining the duration of application of a braking signal to a servo motor comprising the steps of:

counting at a fixed clock rate;

generating signals indicative of the speed of said servo motor;

establishing a timed clock interval such that the occurrence of one of said speed indicative signals during said interval will establish the beginning of a new time interval and the lack of occurrence of one of said speed indicative pulses in said interval will indicate that the speed of the motor has fallen below a predetermined value;

monitoring said speed indicative pulses over said established interval; and removing braking energy from the servo motor whenever one of said speed indicative signals does not occur during said established time interval.

13. A method of controlling the duration of application of a braking signal to a servo motor so as to eliminate over-shoot, said method comprising the steps of:

providing braking energy to the servo motor;

generating signals indicative of the speed of said motor;

establishing a predetermined time interval such that the occurrence of a speed indicative pulse within the interval signifies that the motor speed has not been sufficiently reduced to terminate the braking energy;

monitoring for the occurrence of one of said speed indicative signals during said established time interval;

restarting said time interval in response to the occurrence of one of said speed indicative pulses; and terminating the application of braking energy to said servo motor whenever no speed indicative pulses occur during said established time interval.

* * * * *